United States Patent
Ciodaru et al.

(10) Patent No.: US 8,700,632 B2
(45) Date of Patent: Apr. 15, 2014

(54) MANAGING HETEROGENEOUS DATA

(75) Inventors: Florin Ciodaru, Simi Valley, CA (US);
Flaviu Matan, Bucharest (RO)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 13/353,188

(22) Filed: Jan. 18, 2012

(65) Prior Publication Data

US 2012/0303625 A1 Nov. 29, 2012

Related U.S. Application Data

(60) Provisional application No. 61/490,405, filed on May 26, 2011.

(51) Int. Cl.
*G06F 7/00* (2006.01)
*G06F 17/30* (2006.01)

(52) U.S. Cl.
USPC .......................................... 707/740; 707/802

(58) Field of Classification Search
USPC .................................................. 707/802, 740
See application file for complete search history.

(56) References Cited

U.S. PATENT DOCUMENTS

| | | | |
|---|---|---|---|
| 7,895,238 B2 * | 2/2011 | Poness | 707/797 |
| 8,224,862 B2 * | 7/2012 | Sacks | 707/797 |
| 2004/0181538 A1 * | 9/2004 | Lo et al. | 707/100 |
| 2005/0160159 A1 * | 7/2005 | Zimmer et al. | 709/223 |
| 2006/0064428 A1 * | 3/2006 | Colaco et al. | 707/101 |
| 2008/0126394 A1 * | 5/2008 | Jain et al. | 707/102 |
| 2009/0144251 A1 * | 6/2009 | Dettinger et al. | 707/3 |

* cited by examiner

*Primary Examiner* — Cam Truong
(74) *Attorney, Agent, or Firm* — SoCal IP Law Group LLP; John E. Gunther; Steven C. Sereboff

(57) ABSTRACT

Methods of managing data. A master catalog of properties may be generated. An object model catalog containing a plurality of object models may be generated, each object model including at least one property listed in the master catalog. A data set including a plurality of data objects may be defined, each data object an instantiation of a respective object model from the object model catalog. Data may be collected in accordance with the data set definition. Data collection may be performed, at least in part, by an automatic data collection system.

12 Claims, 9 Drawing Sheets

(c) 2011 Ixia

610

```
<Property name="type" type="enumerated" id="port.vport.type" >    ⎯ 612
  <Profiles>                                                      ⎯ 614
    <DataCollection="TE" />
    <Serialization="binary" file="TE/port_vport.bin" />
    <Storage="db" table="port_vport" column="type" />
  </Profiles>
</Property>
```

620

```
<Property name="name" type="string" id="port.vport.name" >        ⎯ 622
  <Profiles>                                                      ⎯ 624
    <DataCollection="TE" />
    <Serialization="binary" file="TE/port_vport.bin" />
    <Storage="db" table="port_vport" column="name" />
  </Profiles>
</Property>
```

630

```
<Property name="txMode" type="enumerated" id="port.vport.txMode" > ⎯ 632
  <Profiles>                                                       ⎯ 634
    <DataCollection="TE" />
    <Serialization="binary" file="TE/port_vport.bin" />
    <Storage="db" table="port_vport" column="txMode" />
  </Profiles>
</Property>
```

(c) 2011 Ixia

FIG. 6

```
<Object name="Port" id="port" >
  <Property id="port.vport.type" >
    <EnumValues>
      <Value>ATM</Value>
      <Value>Ethernet</Value>
      <Value>tenGigE</Value>
      <Value>hundredGigE</Value>
      <Value>Fcoe</Value>
      <Value>tenGigFcoe</Value>
    </EnumValues>
  </Property>
  <Property id="port.vport.name" >
  <Property id="port.vport.txMode" >
    <EnumValues>
      <Value>interleaved</Value>
      <Value>sequential</Value>
    </EnumValues>
  </Property>
  <Property id="port.vport.vport_id" >
    <Mapping id="port.stats.vport_id" />
  </Property>
```

FIG. 7

MANAGING HETEROGENEOUS DATA

RELATED APPLICATION INFORMATION

This patent claims priority from Provisional Patent Application No. 61/490,405, filed May 26, 2011, entitled MANAGING HETROGENEOUS DATA.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a hierarchical structure for manipulating large heterogeneous data sets including data collection, processing, and reporting.

2. Description of the Related Art

Many complex systems collect or generate large quantities of heterogeneous data, which may include different data types or structures, data from different sources, data collected at different times, and data having different levels of maturity or sophistication (i.e. raw data, processed data, aggregated data, summary data, etc.). Such data is typically eventually stored in a plurality of interlinked tables in a relational data base. However, a substantial effort may be required to design a unique database for each system.

DESCRIPTION OF THE DRAWINGS

FIG. 6 shows further examples of properties.

FIG. 7 is another example of an object model.

Throughout this description, elements appearing in block diagrams are assigned three-digit reference designators, where the most significant digit is the figure number where the element is introduced and the two least significant digits are specific to the element.

DETAILED DESCRIPTION

Description of Apparatus

Figure 1:
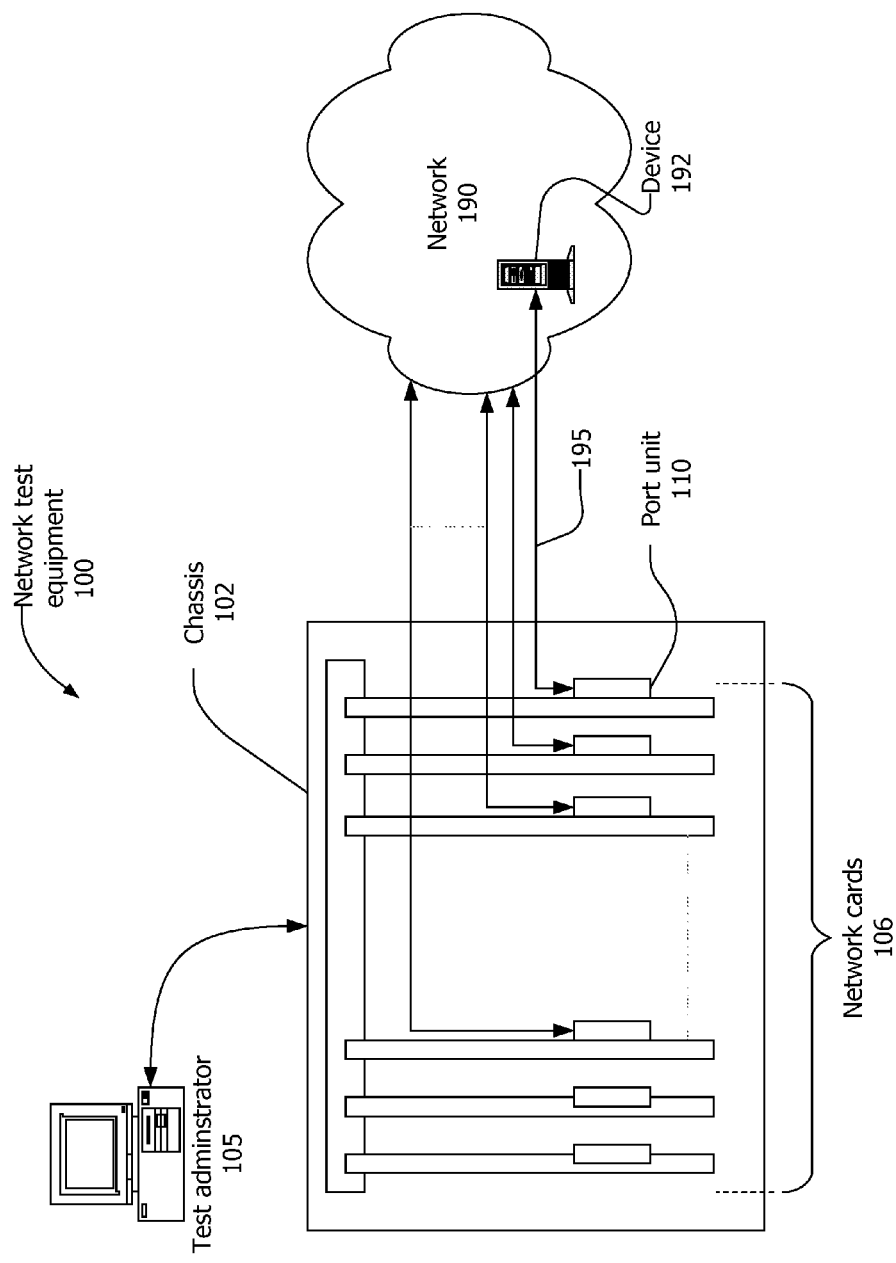
FIG. 1 is a block diagram of an exemplary data collection system in the form of a network testing environment.

FIG. 1 shows a block diagram of a network testing environment. The network environment may include network test equipment 100, a network 190 and one or more network devices 192. A network testing environment is an example of a complex data collection system. The methods described herein are not limited to network testing and network testing systems.

The network 190 may be a Local Area Network (LAN), a Wide Area Network (WAN), a Storage Area Network (SAN), wired, wireless, or a combination of these, and may include or be the Internet. The network devices 192 may be any devices capable of communicating over the network 190.

The network test equipment 100 may be a network testing device, performance analyzer, conformance validation system, network analyzer, or network management system. The network test equipment 100 may include one or more network cards 106 contained or enclosed within a chassis 102. The network test equipment 100 may be an integrated unit, as shown in FIG. 1. Alternatively, the network test equipment 100 may comprise a number of separate units cooperative to provide traffic generation and/or analysis.

The network test equipment 100 may include or be coupled to a test administrator 105. The test administrator 105 may be computing device external to or within the chassis 102. The test administrator 105 may be, for example, a personal computer, a workstation, a server, or another computing device.

In order to test the network 190 and/or the network device 192, the test equipment 100 may generate test traffic comprising a large number of data units or packets and transmit the test traffic into the network at one or more ports. After the test traffic transits the network, the test equipment 100 may receive the test traffic at different ports. In this context, the term "port" refers to a communications connection between the network and the equipment used to test the network. The term "port unit" refers to a module within the network test equipment 100 that connects to the network at a port. The received test traffic may be analyzed to measure the performance of the network.

Each network card 114 may contain one or more port unit 110 connected to the network 190 through a respective port. Each port may be connected to the network through a respective communication medium 195, which may be a wire, an optical fiber, a wireless link, or other communication medium. Each port unit 120 may generate and transmit test traffic to the network, and each port unit 120 may receive test traffic from the network. Test traffic transmitted by one of the port units 120 may commonly be received by one or more other port units.

Port units that receive test traffic may accumulate data about the test traffic. For example, port units that receive test traffic may accumulate test statistics such as how many data units were received, what type of data units were received, how many received data units had errors, and/or the minimum, maximum, and average latency time (how long it took for a data unit to transit the network under test) of the received data units. For the purposes of test data collection, test traffic may be divided into flows, where a flow is a sequence of data units of a specific type sent from a single source address to a single destination address. Each port unit may emulate a large number of source and/or destination addresses. Testing a complex network may involve hundreds of port units that send, receive, and accumulate test statistics on a million or more flows totaling many millions of data units. Thus network testing generates a very large data set that must be managed and reported upon.

Figure 2:
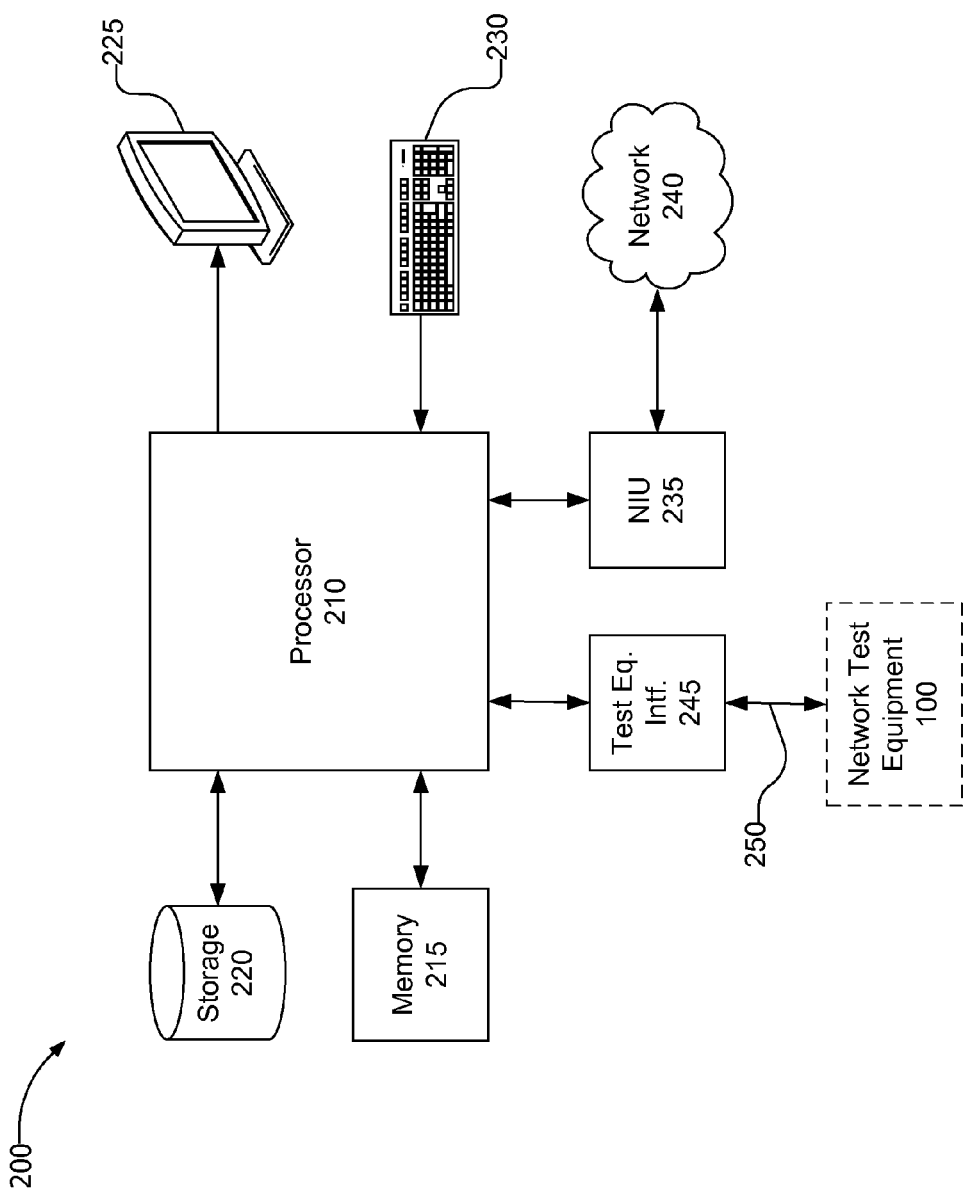
FIG. 2 is a block diagram of a computing device.

FIG. 2 is a block diagram of a computing device 200 that may be suitable for use as the test administrator 105. The computing device 200 may include hardware and software and/or firmware adapted to perform the processes subsequently described herein. The computing device may include a processor 210 coupled to memory 215 and a storage device 220.

As used herein, a storage device is a device that allows for reading data from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media. The term "storage medium" does not include transient medium such as communication media, waveforms, or signals that may convey data but do not store data.

The computing device 200 may include or interface with a display device 225 and one or more input devices such a keyboard 230. The computing device 200 may also include a network interface unit (NIU) 235 to interface with one or more networks 240. The interface between the computing device 200 and the network 240 may be wired or wireless. The network 240 may be the Internet or any other private or public network.

The computing device 200 may also include a test equipment interface 245 to interface with the network test equipment 100 of FIG. 1. The test equipment interface 245 acts as a link between the computing device 200 and the network test equipment 100 and may be a parallel bus, such as a PCI (peripheral component interconnect) bus, a serial bus such as a PCI Express or USB (universal serial bus) bus, a wired or wireless network, or some other communications link.

The processes, functionality and features of the computing device 200 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 200 may run one or more software programs as previously described and may run an operating system, including, for example, versions of the Linux, Unix, MS-DOS, Microsoft Windows, Palm OS, Solaris, Symbian, and Apple Mac OS X operating systems. One or more application programs and/or the operating system may be stored on a storage medium within the storage device 220. The hardware and software and their functions may be distributed such that some functions are performed by the processor 210 and others by other devices.

Description of Processes

Figure 3:
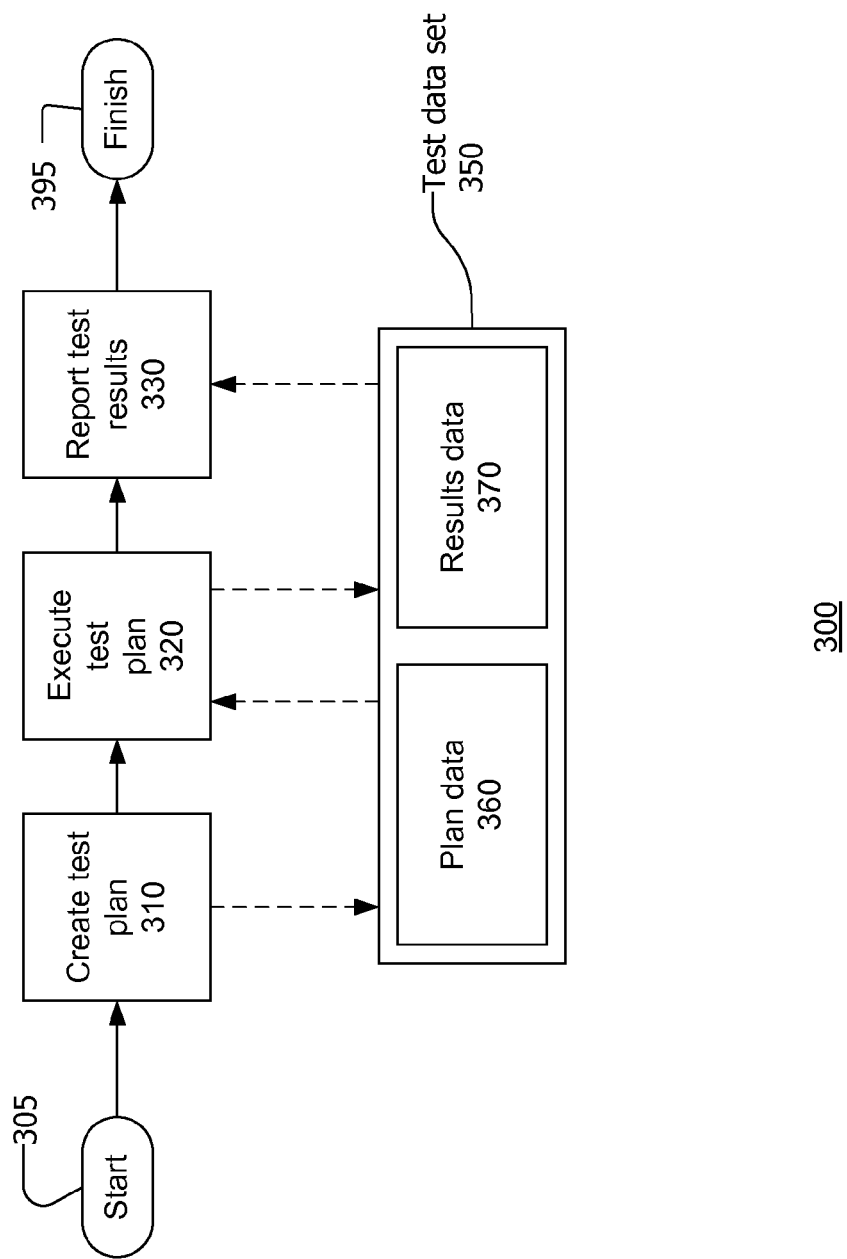
FIG. 3 is a flow chart of a method for testing a network.

Referring now to FIG. 3, a simplified process 300 for testing a network may start at 305 and finish at 395. The process 300 may be divided, for purposes of description, into three actions. First, a test plan may be created at 310. Second, the test plan may be executed at 320. Third, test results may be reported at 330. For ease of explanation, the process 300 is shown as a series of sequential actions. However, the process 300 may be cyclic in nature. For example, test results reported at 330 may be used to modify the test plan created at 310 while a test session is in progress.

The process 300 may be performed, for example, by a test administrator computing device, such as the test administrator 105, coupled to one or more port units, such as the port unit 110. The test administrator computing device 105 may be supervised by one or more test engineers or other operators who may provide inputs to automated tools that perform at least part of the process 300.

The process 300 may begin by creating, at 310, a test plan for a test session. Creating the test plan may include determining how many test ports will be involved in the test session and where each test port will connect to the network. Creating the test plan may also include defining what each test port will emulate during the test session. Each test port may emulate as little as a single IP (internet protocol) address and as much as an entire network encompassing a large plurality of IP addresses. Creating the test plan may include defining control packets that will advertise each test port to routers, switches, and other devices within the network using one or more standard routing protocols.

Creating the test plan at 310 may further include defining test traffic to be generated during the test session. The test traffic may be defined, for example, as a plurality of streams. Each stream may be described by stream data that defines attributes of the stream such as source port; transmission frequency; fixed and variables fields of the data units in the stream such as, for example, protocol or type of data unit, source and destination IP addresses, type of service, and payload content; and other characteristics of each data unit in the stream.

Creating the test plan at 310 may also include defining what test data will be measured and accumulated during the test session. The test data may include, for example, traffic statistics such as number of packets, number of errors, timestamps, latency times, and other traffics statistics to be accumulated for predetermined groups of packets. The test data may also include captured data units, selected according to criteria defined in the test plan.

The test plan created at 310 may be documented by plan data 360. The plan data 360 may include data object and elements documenting the ports, streams, and other aspects of the test plan. Additionally, the test plan created at 310 may include an outline or template for results data 370. This template may indicate what results data 370 should be collected during the test session and how that results data 370 should be processed and stored. The plan data 360 and the results data 370 may be considered as a test data set 350.

At 320, the test session may be executed in accordance with the test plan data 360 defined at 310. The test plan data may be parsed and translated into parameters and instructions for use by the hardware and software that executes the test plan. Executing the test session at 320 may also include collecting and storing the results data 370 in accordance with the template established at 310.

Test results may be reported at 330. Reporting test results may include retrieving, processing, aggregating, displaying selected information from the results data 370. Reporting test results may rely on the plan data 360 to define what results data is available and how the available data is stored. Reporting test results at 330 may be interactive and or iterative, with each report prompting a request from a user for additional reports or data.

Figure 4:
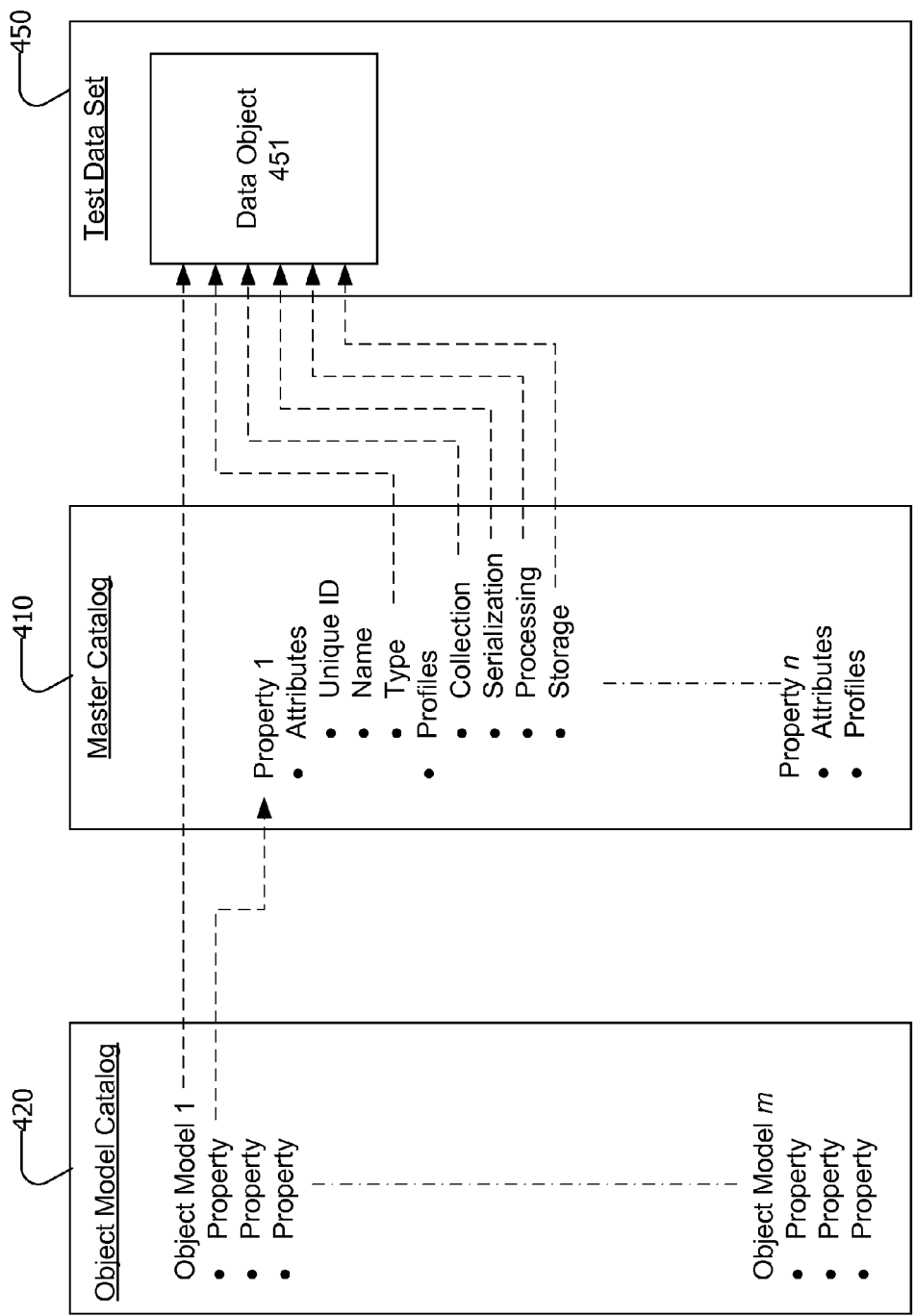
FIG. 4 is a graphical representation of a hierarchical structure for managing data.

FIG. 4 is a graphical illustration of a hierarchical structure for managing complex heterogeneous data, such as the test data set 350 resulting from the process 300. The hierarchical structure may include a master catalog 410, an object model catalog 420, and the test data set 450. The master catalog 410 may define a plurality of variables or data items, herein termed "properties", that may be found in the data set 450. Each property in the catalog may have attributes and profiles. In this context, an "attribute" is information that defines what a property is, such as a unique identifier, a name, and a data type. A "profile" is information that defines how a property may be managed and used. Profiles may define how a property is collected, how a property is serialized for storage and transmission, if and how a property is processed, and how and where a property may be stored.

The object model catalog 420 may define a plurality of object models or templates for data objects that may be incorporated into the test data set 430. Each object model may include one or more properties from the master catalog 410. When an object model includes a property, a data object based on the object model inherits the attributes and profiles associated with the property. Object models may not change attributes and/or profiles associated with properties, but may add constraints or additional information within the boundaries of an attribute or profile. Object models may also define relationships between properties.

The test data set 450 may include a plurality of data objects, such as data object 451, based on object models from the object model catalog 420. The test data set 450 may include multiple instances of models from the object model catalog, with each instance given a unique identifier. The test data set 450 may include plan data, such as the plan data 360 defined at 310 in the process 300. The test data set 450 may also include results data, such as the results data defined at 310 and populated with actual data values at 320 in the process 300.

The master catalog 410 and the object model catalog 420 may be written in extensible markup language (XML) or another markup language.

Figure 5:
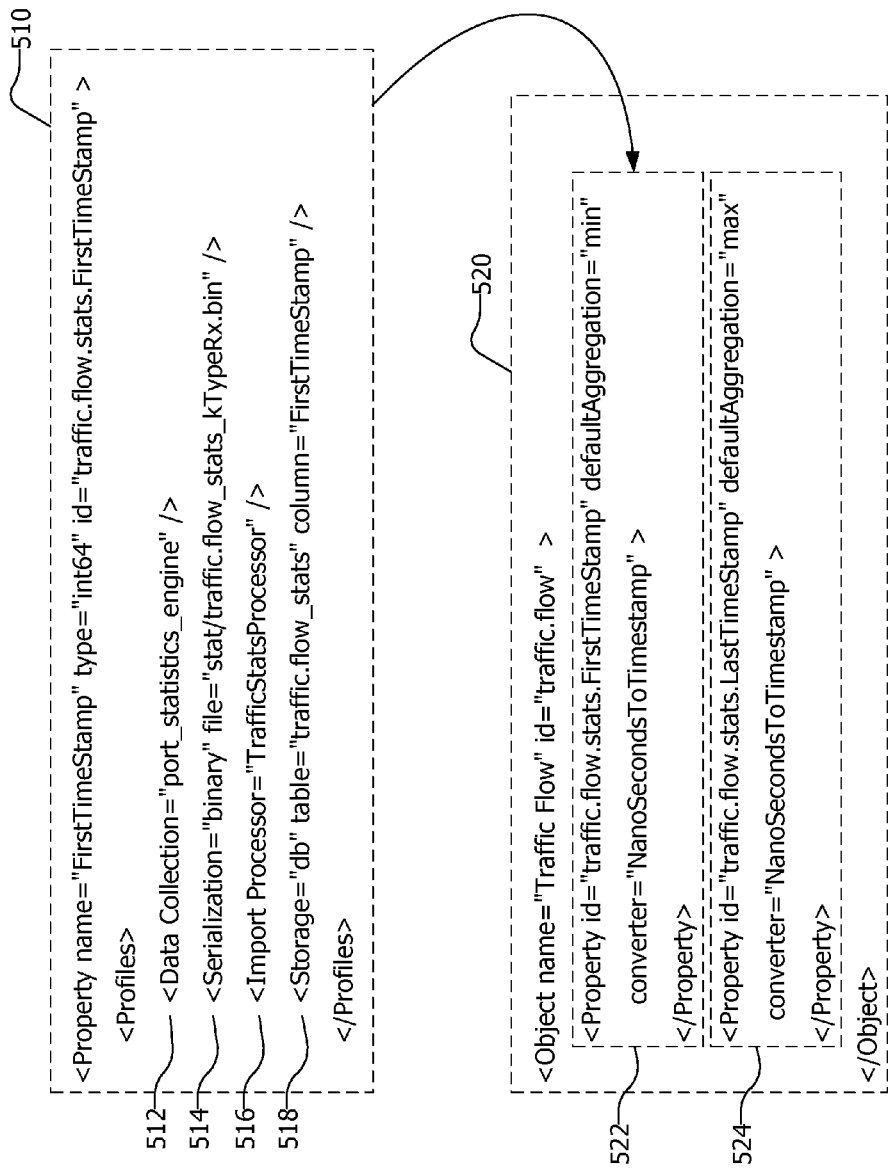
FIG. 5 shows an example of a property and an example of an object model including the example property.

FIG. 5 shows an exemplary property 510 and an exemplary object model 520 that incorporates the property 510. The property 510 may be representative of properties stored in the master catalog 410. The object model 520 may be representative of object models stored in the object model catalog 420. In this example, the property 510 and the object model 520 are written in XML.

The property 510 has attributes including a name "FirstTimeStamp", a data type "int64" (64-bit integer), and a unique identifier "traffic.flow.stats.FirstTimeStamp". The values of these attributes are exemplary. A property may have more or fewer that three attributes.

The property 510 also includes profiles for "Data Collection" 512, "Serialization" 514, "Import Processor" 516, and "Storage" 518. The Data Collection profile 512 is defined to be "port_statistics_engine", which, in this example, indicates that the property 510 is collected by hardware within port units connected to the network under test. The Serialization profile 514 is "binary" (as opposed to XML, for example) and the serialized data is placed in a file "stat/traffic.flow_stats_kTypeRx.bin". The Import Processor profile 516 is "TrafficStatsProcessor", which indicates that the property is processed by a software module of that name. The Storage profile 518 is "db", indicating that processed data for the property 510 is stored in a database. Additional information in the Storage profile 518 specifies that data for property 510 is stored in a specific table within the database, and a specific column within the table.

The attributes and profiles 512, 514, 516, 518 for the property 510 are specific to this example, which is in turn specific to a network testing system. Properties for other data collection systems may have different attributes and different profiles. Properties for other data collection systems may have more or fewer attributes and more or fewer profiles. A property may have at least an attribute defining a unique property identifier. A property may typically also have an attribute defining a data type. A property may have at least a data collection profile indicating how the data is acquired or collected, and a storage profile indicating how the data is stored. Each profile may be selected from a plurality of predefined alternatives which have meaning in the context of the data collection system. For example, each alternative data collection profile may identify a specific hardware element, software module, or communications path used to collect the data. Each alternative storage profile may identify a database table and column, a file name, or other data storage mechanism.

The exemplary object 520 has attributes including an object name and a unique object identifier and inherits the attributes of two properties 522, 524. The property 522 is an instance of the property 510 as previously described. Thus the property 522 inherits the attributes and profiles associated with property 510. An object, such as the object 520, may not modify the attributes and profiles of a property included in the object. An object may define constraints or modifications within boundaries set by the profiles of a property. In the example of FIG. 5, the object 520 modifies the property 522 by specifying that the default aggregation (used when the property 522 is combined with other instances of the property 510) is "minimum" and that the property 522 is processed using a converter "NanoSecondsToTimestamp", which is an algorithm, within the software module "TrafficStatsProcessor" specified by the Import Processor profile of the property 510. The property 524 inherits the attributes associated with a different property, "LastTimeStamp" but otherwise operates in a similar manner to that of property 522.

FIG. 6 shows three additional exemplary properties 610, 620, 630. Each property includes attributes (612, 622, 632, respectively) including a name, a data type, and a unique identifier. Each property 610, 620, 630 includes profiles (614, 624, 634, respectively) including Data Collection, Serialization, and Storage profiles. Each property 610, 620, 630 includes a storage profile of "TE", which indicates that the data is collected via an interactive Test Editor. Each property 610, 620, 630 includes a serialization profile of "binary", and a storage profile of "db", as previously described. The properties 610, 620, 630 are serialized into a common file and are stored in separate columns of the same database table.

FIG. 7 shows another exemplary object model 710 which includes instances of the properties 610, 620, and 630 of FIG. 6. Specifically, property 720 is an instance of property 610. The property 610 is an enumerated data item, which means that the data item must have a value selected from a predetermined list of values. The property 720 is constrained to six allowable values: "ATM" (asynchronous transfer mode), "Ethernet", "tenGigE" (ten gigabit Ethernet), "hundredGigE" (hundred gigabit Ethernet), "Fcoe" (fiber channel over Ethernet), and "tenGigFcoe" (ten gigabit fiber channel over Ethernet). Other instances of the property 610 may have more or fewer or different allowed values. Similarly, property 730 is an instance of the property 620, and property 740 is an instance of the property 630. Property 740 is constrained to two allowed values, "interleaved" and "sequential". The constraints on properties 720 and 740 are specific to this example.

The object model 710 also includes a property "port.vport.vport_id". The object model 710 maps the property 750 to a property "port.stats.vport_id", which is a property within a different object model. Mapping may used to specify different properties having the same meaning. Mapping may be used to correlate, combine, and report data from different objects, similar to use of foreign keys in databases.

Figure 8:
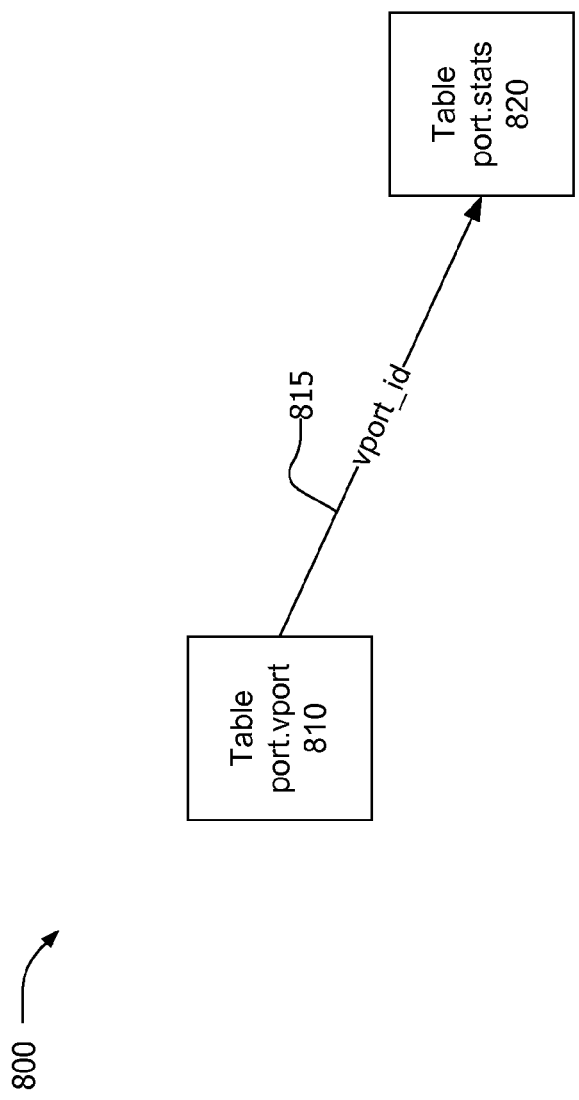
FIG. 8 is an acyclic graph.

In the example of FIG. 7, a relationship is created between the property "port.vport.vport_id" and property "port.stats.vport_id". After the data set for a data collection system is defined, software may automatically create a directed acyclic graph having database tables as nodes and relationships as edges. An exemplary graph 800, based on the example of FIG. 7, is shown in FIG. 8. A table "port.vport" 810 is joined to a table "port.stats" 820 by an edge "vport_id" 815, indicating the columns "vport_id" in each table have the same meaning. A graph such as the graph 800 may then be used to automatically generate database joins when summarizing and reporting data from the data set. A graph representing a complex data set may have many more than two nodes and many more than one edge.

Figure 9:
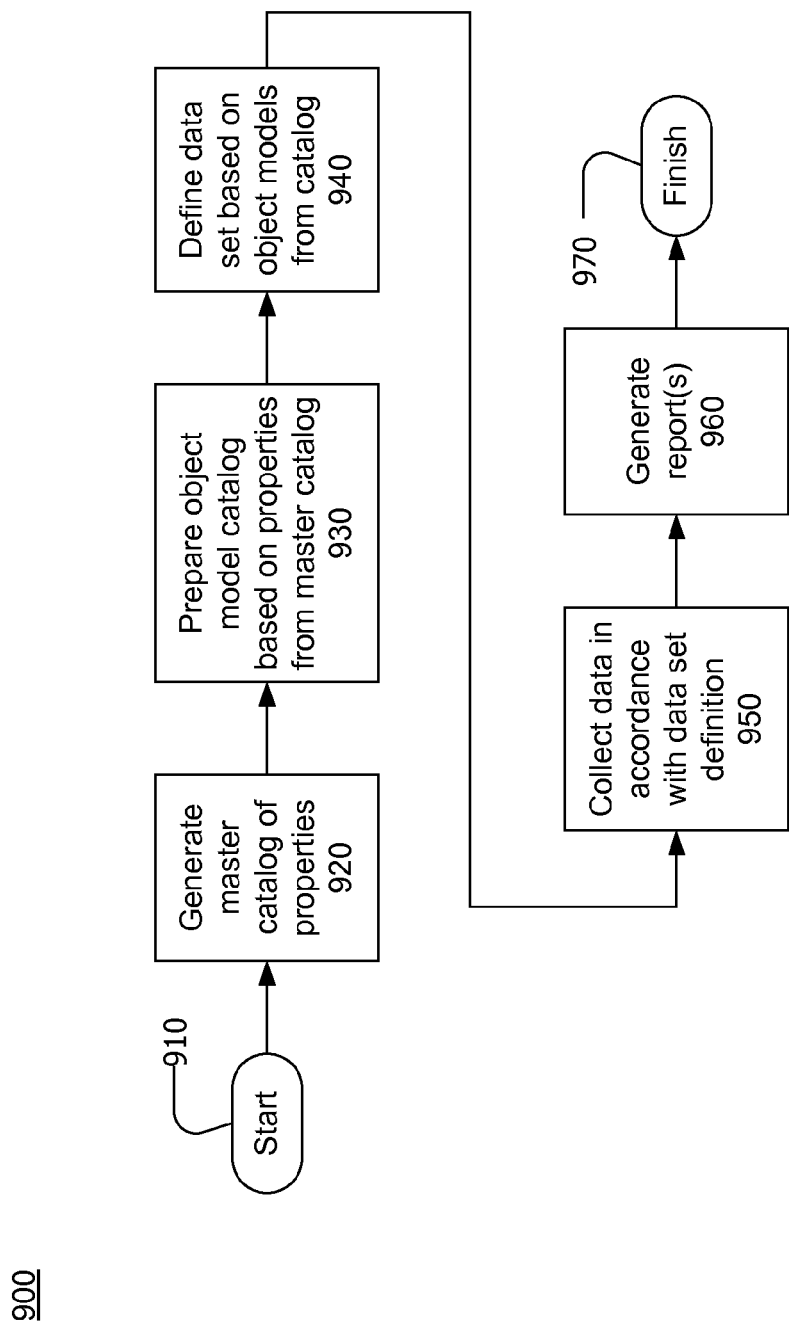
FIG. 9 is a flow chart of a process for managing a heterogeneous data set.

Referring now to FIG. 9, a process 900 for managing a heterogeneous data set may start at 910 and conclude at 970. At 920, a master catalog of properties may be generated. The master catalog may contain a plurality of properties. Each of the plurality of properties in the master catalog may represent a data item. Each property may have at least one attribute defining the represented data item, and at least one profile defining how the represented data item is managed. Each property may have an attribute that associates the property with a unique identifier. Each property may also have an attribute indicating a data type of the represented data. Each property may have at least a collection profile indicating how the represented data is collected and a storage profile indicating how the represented data is stored. The collection profile may be selected from a predefined plurality of profiles indicating alternative data collection techniques. The data storage profile may be selected form a predetermined plurality of profiles defining alternative data storage techniques. Other profiles included in a property may be selected from predetermined alternatives.

At 930, an object model catalog may be prepared. The object model catalog may contain a plurality of object models. Each of the plurality of object models may represent a data object. Each object model may have at least one attribute defining the represented data object. Each object model may include at least one property from the master catalog generated at 920. An object model may not modify attributes or profiles of a property included in the object model, but may add constraints and/or definitions within the boundaries of a profile. An object model may define one or more relationships between one or more properties of the object model and one or more properties of other object models.

At 940, a data set may be defined. The data set may contain a plurality of data objects. Each of the plurality of data objects may be an instantiation of an object model from the object model catalog. The data set may include instantiations of one, some, or all of the object models in the object model catalog. The data set may include multiple instantiations of one or more object models.

At 950, data may be collected in accordance the data set defined at 940. Collecting data for a specific data object within the data set may include referring to the object model for the data object to determine the properties of data items within the data object and any constraints on those properties. Collecting data for the specific data item may also include retrieving, from the master catalog, attributes and profiles for the properties within the data object to determine how each data item is collected and stored.

Collecting data at 950 may be performed, at least in part, automatically. In this patent, "automatically" and "automatic" means "by a machine without user participation". Data may be collected by an automatic data collection system comprising data collection hardware which may be augmented by firmware and/or software executing on one or more processors included in the data collection hardware. Collecting data at 950 may include parsing the data set definition from 940 and the associated object models and properties to generate instructions for the automatic data collection system. In this context, "instructions" is intended to encompass both software instructions and information such as parameters, masks, constants, and other information input to the data collection system.

At 960, reports may be generated based on the data collected at 950. Generating reports may include retrieving, processing, filtering, aggregating, and summarizing data collected at 950. Generating reports may include referring to the data set definition, and retrieving, from the master catalog, attributes and profiles for the properties used in the data set definition to determine how each data item is collected and stored.

Generating reports at 950 may be performed, at least in part, automatically by an automatic report generator. For example, a predetermined suite of reports may be generated automatically after a data collection session, or specific reports may be generated automatically in response to user requests. Collecting data at 950 may include parsing the data set definition from 940 and the associated object models and properties to generate instructions for the automatic report generator.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of managing heterogeneous data, comprising:
generating a master catalog listing a plurality of properties, each property of the plurality of properties representing a data item, each property of the plurality of properties including at least one attribute defining the represented data item and two or more profiles indicating how the data item is managed, the profiles including a collection profile indicating how the represented data item is collected and a storage profile indicating how the represented data item is stored, wherein the master catalog and the object model catalog are be written in extensible markup language or another markup language;
preparing an object model catalog containing a plurality of object models, each object model of the plurality of object models including at least one property listed in the master catalog;
defining a data set definition including a plurality of data objects, each data object contains an instantiation of a respective object model from the object model catalog, the data set definition including multiple instantiations of at least one object model; and collecting data in accordance with the data set definition, collecting data performed, at least in part, by an automatic data collection system, wherein the collecting data comprises: parsing the data set definition and associated object models and properties to provide instructions for the automatic data collection system;

generating reports based on the collected data, wherein the generating reports include referring to the data set definition;

and retrieving, from the master catalog, attributes and profiles for the properties used in the data set definition to determine how each data item is collected and stored.

2. The method of claim 1, wherein the at least one attribute includes a unique identifier.

3. The method of claim 2, wherein the at least one attribute also includes a data type.

4. The method of claim 1, further comprising:

selecting the collection profile from a first plurality of predetermined profiles defining respective data collection techniques; and selecting the storage profile from a second plurality of predetermined profiles defining respective data storage techniques.

5. The method of claim 4, wherein
the two or more profiles include a third profile in addition to the collection profile and the storage profile,
the third profile selected from a third plurality of predetermined profiles.

6. The method of claim 1, wherein generating reports is performed, at least in part, by an automatic report generator.

7. A method of managing heterogeneous data, comprising:

defining a data set definition including a plurality of data objects, each data object contains an instantiation of a respective object model from an object model catalog of a plurality of object models, the data set definition including multiple instantiations of at least one object model, each model of the plurality of object models including at least one property from a master catalog listing a plurality of properties, wherein the master catalog lists all properties included in the plurality of object models, wherein
each property of the plurality of properties represents a data item,
each property of the plurality of properties includes at least one attribute defining the represented data item,
each property of the plurality of properties includes two or more profiles indicating how the data item is managed, the two or more profiles including a collection profile indicating how the represented data item is collected and a storage profile indicating how the represented data item is stored, and
the master catalog and the object model catalog are written in extensible markup language or another markup language;

collecting data in accordance with the data set definition, collecting data performed, at least in part, by an automatic data collection system, the collecting data including parsing the data set definition and associated object models and properties to provide instructions for the automatic data collection system; and generating reports based on the collected data, generating reports including referring to the data set definition and retrieving, from the master catalog, attributes and profiles for the properties used in the data set definition to determine how each data item is collected and stored.

8. The method of claim 7, wherein the at least one attribute includes a unique identifier.

9. The method of claim 8, wherein the at least one attribute also includes a data type.

10. The method of claim 7, wherein
the collection profile is one of a first plurality of predetermined profiles defining respective data collection techniques, and
the storage profile is one of a second plurality of predetermined profiles defining respective data storage techniques.

11. The method of claim 10, wherein
the two or more profiles include a third profile in addition to the collection profile and the storage profile,
the third profile is one of a third plurality of predetermined profiles.

12. The method of claim 7, wherein generating reports is performed, at least in part, by an automatic report generator.

* * * * *

UNITED STATES PATENT AND TRADEMARK OFFICE
CERTIFICATE OF CORRECTION

PATENT NO. : 8,700,632 B2
APPLICATION NO. : 13/353188
DATED : April 15, 2014
INVENTOR(S) : Ciodaru et al.

Page 1 of 1

It is certified that error appears in the above-identified patent and that said Letters Patent is hereby corrected as shown below:

In the Claims

Column 8, line 57: delete "be".

Signed and Sealed this
Eighth Day of July, 2014

Michelle K. Lee
*Deputy Director of the United States Patent and Trademark Office*